(12) United States Patent
Husain et al.

(10) Patent No.: US 10,229,653 B2
(45) Date of Patent: Mar. 12, 2019

(54) NAVIGATION SYSTEM WITH PROVIDING DISPLAY AREA MECHANISM AND METHOD OF OPERATION THEREOF

(71) Applicant: Telenav, Inc., Sunnyvale, CA (US)

(72) Inventors: Aliasgar Mumtaz Husain, Milpitas, CA (US); Gregory Stewart Aist, San Mateo, CA (US); Casey Carter, Sunnyvale, CA (US); Shalu Grover, Sunnyvale, CA (US); Naveen Kumar Vandanapu, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 260 days.

(21) Appl. No.: 14/830,515

(22) Filed: Aug. 19, 2015

(65) Prior Publication Data

US 2017/0053619 A1  Feb. 23, 2017

(51) Int. Cl.
| | |
|---|---|
| *G06F 13/14* | (2006.01) |
| *G09G 5/10* | (2006.01) |
| *G01C 21/36* | (2006.01) |
| *G09G 5/00* | (2006.01) |
| *G09G 5/14* | (2006.01) |

(52) U.S. Cl.
CPC ............ *G09G 5/10* (2013.01); *G01C 21/367* (2013.01); *G09G 5/00* (2013.01); *G09G 5/14* (2013.01); *G09G 2320/0613* (2013.01); *G09G 2320/0686* (2013.01); *G09G 2340/04* (2013.01); *G09G 2340/14* (2013.01); *G09G 2360/144* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 6,735,517 B2 | 5/2004 | Engelsberg et al. | |
| 8,503,088 B2 | 8/2013 | Kuhlman et al. | |
| 8,547,298 B2 | 10/2013 | Szczerba et al. | |
| 2009/0231720 A1* | 9/2009 | Chengalva ......... | G02B 27/0101 359/630 |
| 2011/0001639 A1* | 1/2011 | Sasaki ................ | G02B 27/0101 340/995.19 |
| 2012/0069040 A1* | 3/2012 | Nakasu ................ | G06T 3/0012 345/589 |
| 2014/0092481 A1* | 4/2014 | Hudson .................... | G02B 5/02 359/630 |
| 2014/0152433 A1* | 6/2014 | Sugiyama .............. | B60K 35/00 340/438 |
| 2015/0077826 A1* | 3/2015 | Beckman ............... | G02B 27/01 359/238 |

* cited by examiner

*Primary Examiner* — Weiming He
(74) *Attorney, Agent, or Firm* — Perspectives Law Group, Corp.

(57) ABSTRACT

A method of operation of a navigation system includes: determining a display luminosity with a control unit based on a travel condition; generating a display area based on controlling the display luminosity; and generating a display combination based on the display area including a display extent area, a display non-extent area, or a combination thereof for displaying a display content on a device.

20 Claims, 6 Drawing Sheets

NAVIGATION SYSTEM WITH PROVIDING DISPLAY AREA MECHANISM AND METHOD OF OPERATION THEREOF

TECHNICAL FIELD

The present invention relates generally to a navigation system, and more particularly to a system with display mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving display mechanism to categorize entry has become a paramount concern for the consumer. The inability decreases the benefit of using the tool.

Thus, a need still remains for a navigation system with display mechanism to categorize the entry. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a signal weight with a control unit based on a feature extracted from a user activity; generating an activity model based on the signal weight for representing the feature as a positive weight or a negative weight depending on an activity type, a category of interest, or a combination thereof; classifying a user entry based on comparing the feature of the user entry to the feature represented in the activity model; and determining a user's intention based on the user entry classified for presenting a point of interest on a device.

The present invention provides a navigation system, including a control unit for: generating a signal weight with a control unit based on a feature extracted from a user activity, generating an activity model based on the signal weight for representing the feature as a positive weight or a negative weight depending on an activity type, a category of interest, or a combination thereof, classifying a user entry based on comparing the feature of the user entry to the feature represented in the activity model, determining a user's intention based on the user entry classified, and a communication interface, coupled to the control unit, for communicating the user's intention for displaying a point of interest on a device.

The present invention provides a navigation system having a non-transitory computer readable medium including: generating a signal weight based on a feature extracted from a user activity; generating an activity model based on the signal weight for representing the feature as a positive weight or a negative weight depending on an activity type, a category of interest, or a combination thereof; classifying a user entry based on comparing the feature of the user entry to the feature represented in the activity model; and determining a user's intention based on the user entry classified for presenting a point of interest on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
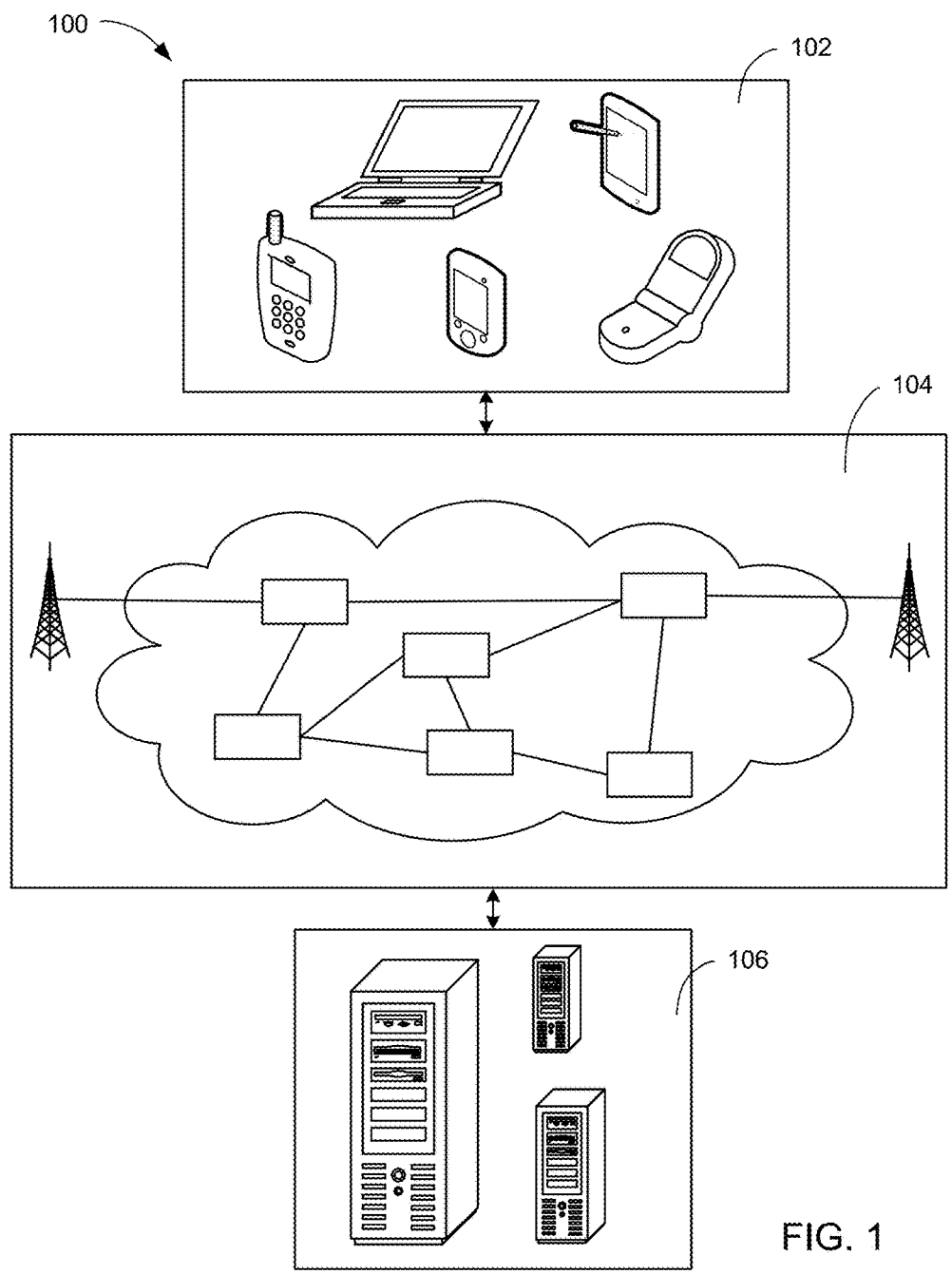
FIG. 1 is a navigation system with display mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with display mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
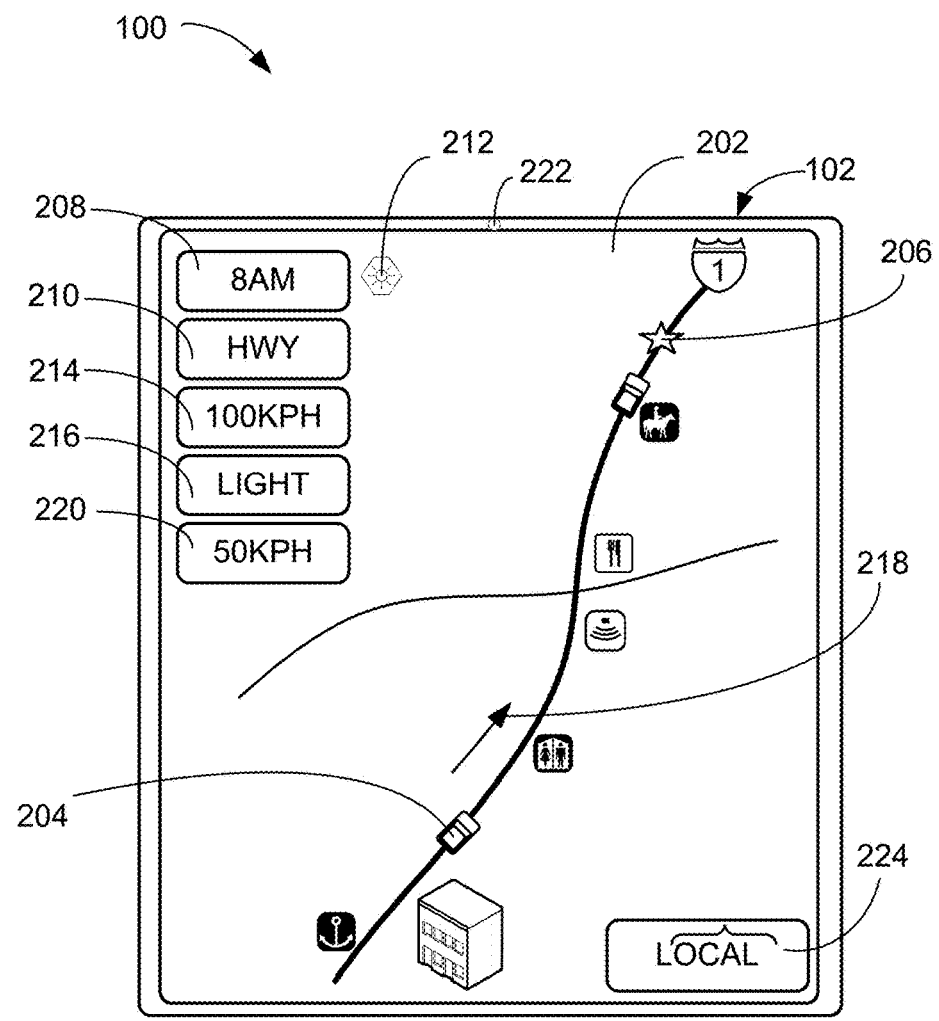
FIG. 2 is an example of a travel condition traveled by the user of the navigation system.

Referring now to FIG. 2, there is shown an example of a travel condition 202 traveled by the user of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The travel condition 202 is defined as a situation, circumstance, factor, or a combination thereof present during the user's travel. For example, the travel condition 202 can include a current location 204, a destination 206, a travel time 208, a road type 210, or a combination thereof. For another example, the travel condition 202 can include a travel brightness 212, a travel speed 214, a traffic condition 216, a travel direction 218, or a combination thereof.

The current location 204 is defined as a representation of where the first device 102 is located. For example, the navigation system 100 can detect the current location 204 representing the digital representation of the physical location where the user of the first device 102 is detected. The destination 206 is defined as a representation of where the user's travel ends. For example, the navigation system 100 can determine the destination 206 representing the digital representation of the physical location where the user's travel ends.

The travel time 208 is defined as a time frame of the user's travel. For example, the travel time 208 for the user's morning commute can start from 8 AM. The travel time 208 can represent the time of day, week, month, year, season, or a combination thereof. The road type 210 is defined as a classification of the road traveled from the user's travel. For example, the road type 210 can include a local road, arterial road, expressway, freeway, highway, or a combination thereof.

The travel brightness 212 is defined as the level of luminance during the user's travel. For example, the travel brightness 212 from the sunlight on a sunny day can be higher than the travel brightness 212 from the sunlight on a cloudy day. For another example, the source of the travel brightness 212 can come from reflection from the sun, snow, inanimate object, such as reflection from window, light emitted from the headlight, or a combination thereof. For further example, the navigation system 100 can measure the travel brightness 212 based on total amount of visible light emitted by a source in units of lumen, lux, or a combination thereof.

The travel speed 214 is defined as the user's travel rate of motion. For example, the user traveling on the road type 210 of highway can reach 100 kilometers per hour operating a vehicle. A speed threshold 220 is a level required for the travel speed 214. For example, the speed threshold 220 can represent the minimum level of the travel speed 214 or the maximum level of the travel speed 214.

The traffic condition 216 is a rate of movement of vehicle, people, or a combination thereof. For example, the traffic condition 216 can include no traffic, light traffic, moderate traffic, heavy traffic, or a combination thereof. The travel direction 218 is user's orientation for where the user's travel is heading. For example, the travel direction 218 can be determined on the Cardinal coordinate system.

The navigation system 100 can capture, detect, determine, or a combination thereof the travel condition 202 using a capturing sensor 222. The capturing sensor 222 is defined as a device to capture, detect, determine, or a combination thereof the travel condition 202. The capturing sensor 222 can include a digital camera, a video camera, a microphone, a portable computing device that can receive radio signals, can have internet connectivity, or the combination thereof.

A user preference 224 is user's predilection. For example, the user preference 224 can indicate that the user prefers to travel on the road type 210 of local road during the travel time 208 of 8 AM to avoid the traffic condition 216 of heavy traffic.

Figure 3:
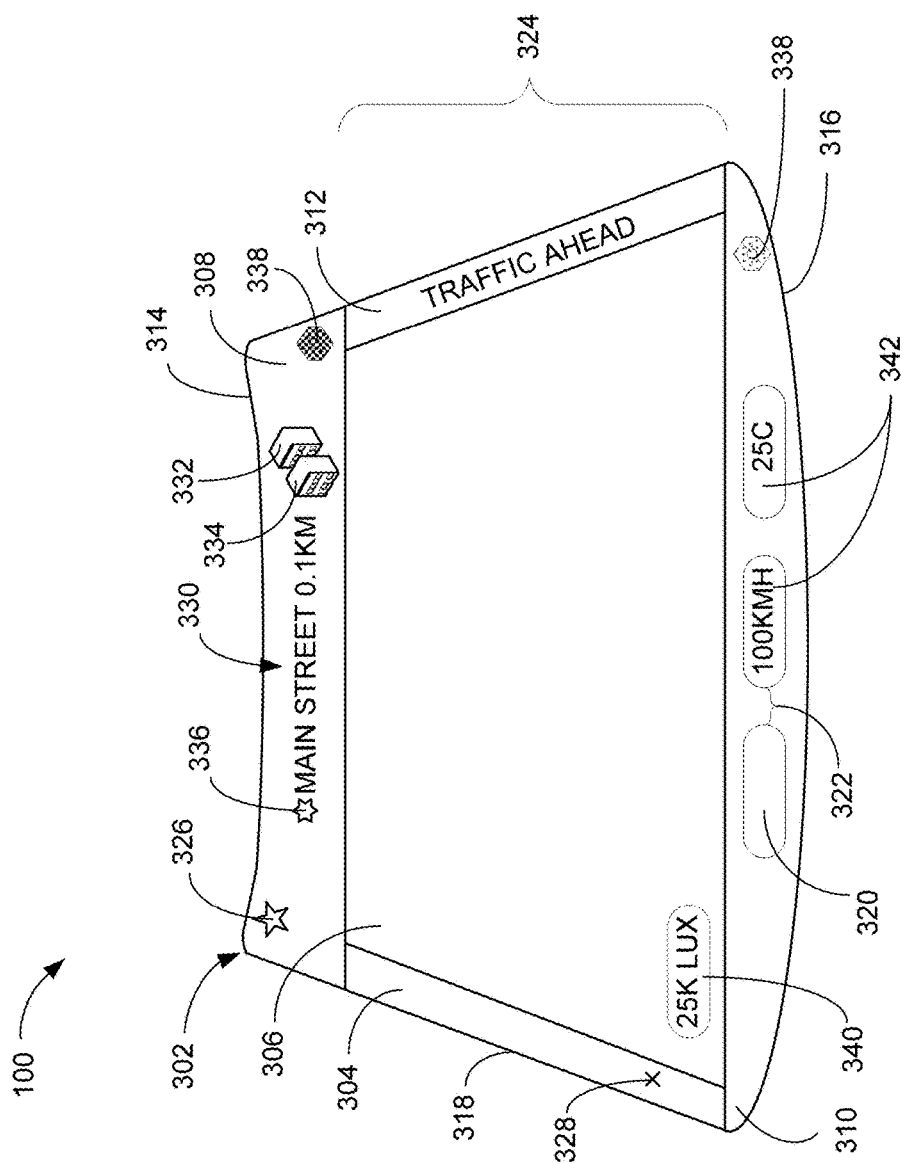
FIG. 3 is an example of a display area.

Referring now to FIG. 3, there is shown an example of a display area 302. The display area 302 is defined as a component of a vehicle where the user can view outside or inside of the vehicle. For example, the display area 302 can represent a windshield of the vehicle. For a different example, the display area 302 can represent a driver side window, a passenger side window, a rear passenger side window, back window, or a combination thereof.

For further example, the display area 302 can represent a liquid crystal display (LCD). More specifically as an example, the display area 302 can include a transparent LCD or similar display film that can allow the navigation system 100 to digitally and dynamically control the display area 302. Details will be discussed below.

The display area 302 can include a display extent area 304, a display non-extent area 306, or a combination thereof. The display extent area 304 and the display non-extent area 306 can have an area shape representing a polygon, a circle, an amorphous shape, or a combination thereof. The display extent area 304 is defined as the display area 302 including at least one periphery as an extent of the display area 302. The display non-extent area 306 is defined as the display area 302 including at least one periphery sharing a periphery with the display extent area 304. More specifically as an example, the extent of the display non-extent area 306 may not share the extent of the display area 302.

The display extent area 304 can include a top extent area 308, a bottom extent area 310, a side extent area 312, or a combination thereof. The top extent area 308 is defined as the display extent area 304 including a top border periphery 314 as a top extent of the display area 302. The bottom extent area 310 is defined as the display extent area 304 including a bottom border periphery 316 as a bottom extent of the display area 302.

The side extent area 312 is defined as the display extent area 304 including a side border periphery 318 as a side extent of the display area 302. More specifically as an example, to illustrate the relative location of the top extent, the bottom extent, or the side extent of the display area 302 relative to each other, using the Cardinal coordinate system, the top extent can be north to the bottom extent and the side extent can be east or west to the top extent and the bottom extent.

For further example, the top extent area 308 can have the top border periphery 314 extending from one side extent to another side extent of the display area 302. The bottom extent area 310 can have the bottom border periphery 316 extending from one side extent to another side extent of the display area 302. The side extent area 312 can have the side border periphery 318 extending from the top extent to the bottom extent of the display area 302.

The display area 302 can include a display subarea 320, a display gap 322, or a combination thereof. The display subarea 320 is defined as a subsection of the display extent area 304. More specifically as an example, the display subarea 320 can have the top border periphery 314, the bottom border periphery 316, or the side border periphery 318 not reaching the extent of the display area 302. The top border periphery 314, the bottom border periphery 316, the side border periphery 318, or a combination thereof of the display subarea 320 can extend within the display extent area 304.

The display extent area 304 can include multiple instances of the display subarea 320. For example, the top extent area 308 can include three instances of the display subarea 320. As a result, the display gap 322 can exist between one instance of the display subarea 320 and another instance of the display subarea 320. The display gap 322 is defined as a space between one instance of the display subarea 320 and another instance of the display subarea 320 within the display extent area 304.

The navigation system 100 can adjust a display size 324 of the display extent area 304, the display non-extent area 306, or a combination thereof. The display size 324 is defined as the surface area. More specifically as an example, the navigation system 100 can adjust the top border periphery 314, the bottom border periphery 316, the side border periphery 318, or a combination thereof of the display extent area 304, the display non-extent area 306, or a combination thereof to modify the display size 324.

The navigation system 100 can assign or determine an area priority 326. The area priority 326 is defined as a level of importance placed on the display extent area 304, the display non-extent area 306, or a combination thereof. More specifically as an example, the navigation system 100 can assign the area priority 326 based on a display location 328 on the display area 302. The display location 328 is defined as a position on the display area 302. For example, the top extent area 308 can have a higher instance of the area priority 326 than the bottom extent area 310 to display certain instance of a display content 330. Details will be discussed below.

The display content 330 is defined as information displayed on the display area 302. For example, the display content 330 can include navigation guidance, advertisement, weather information, the travel condition 202 of FIG. 2, or a combination thereof. For further example, the display content 330 can include a background content 332, a foreground content 334, or a combination thereof. The background content 332 can represent the display content 330 placed behind the foreground content 334.

A content priority 336 is defined as a level importance placed on the display content 330. For example, based on the content priority 336, the navigation system 100 can determine which instance of the display area 302 can display the display content 330. Details will be discussed below.

A display luminosity 338 is a level of brightness of the display area 302. For example, the navigation system 100 can adjust the display luminosity 338 to control the display of the display content 330 on the display area 302. For a different example, the navigation system 100 can adjust the display luminosity 338 of the display extent area 304 to create a shade to control the travel brightness 212 of FIG. 2 affecting the user operating the vehicle. Moreover, the navigation system 100 can adjust the display luminosity 338 based on comparing the travel brightness 212 to a brightness threshold 340. The brightness threshold 340 is defined as a requirement level of the travel brightness 212 to trigger the navigation system 100 to adjust the display luminosity 338.

The navigation system 100 can generate a display combination 342. The display combination 342 is defined as an arrangement of the display extent area 304, the display non-extent area 306, or a combination thereof. More specifically as an example, the display combination 342 can include the top extent area 308 and the display non-extent area 306. For a different example, the display combination 342 can include multiple instances of the display subarea 320 along with the bottom extent area 310.

Figure 4:
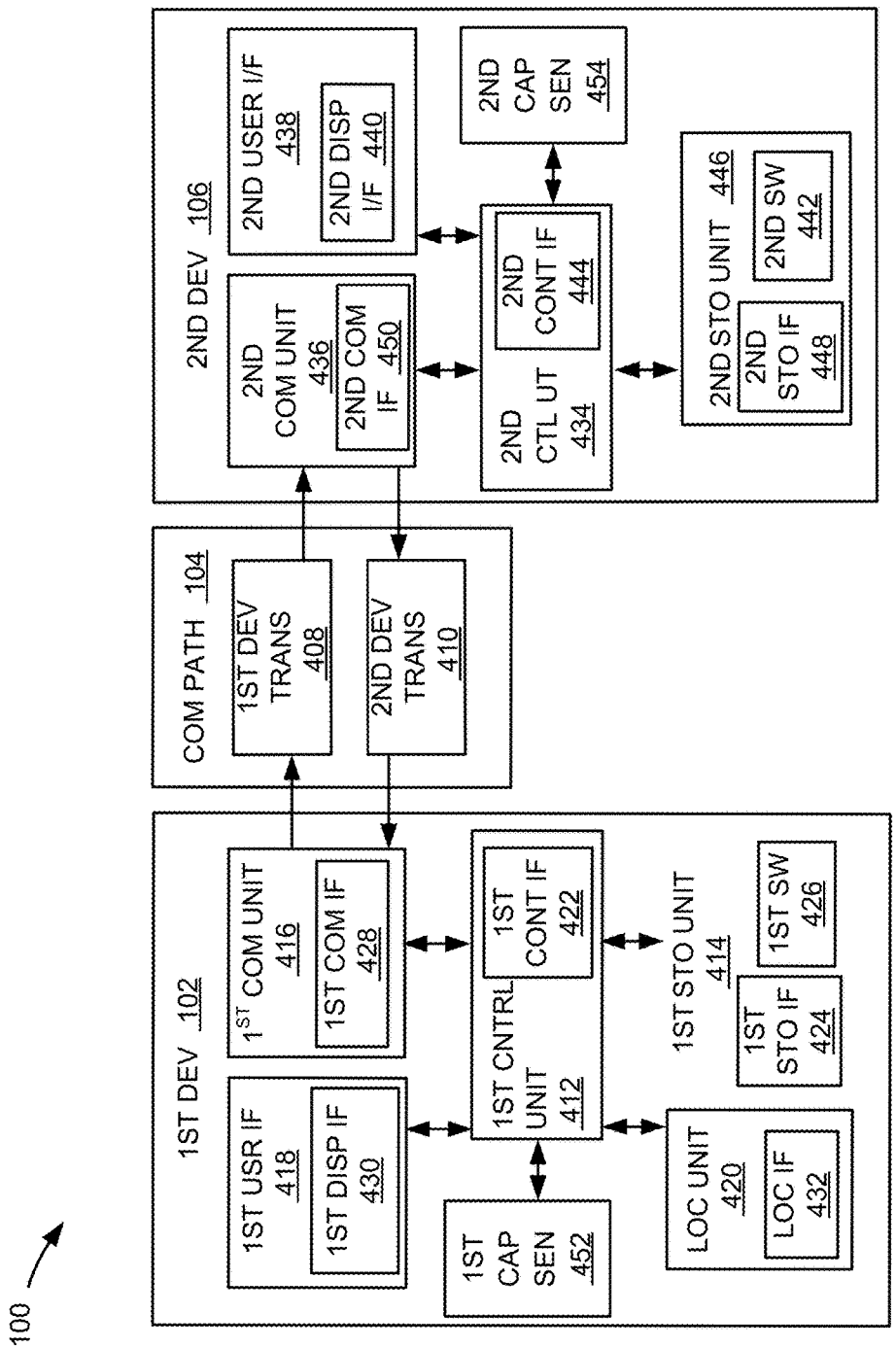
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106.

The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first capturing sensor 452 can be the capturing sensor 222 of FIG. 2. The first capturing sensor 452 can capture the travel condition 202 of FIG. 2. Examples of the first capturing sensor 452 can include a digital camera, video camera, thermal camera, night vision camera, infrared camera, x-ray camera, or the combination thereof. Examples of the first capturing sensor 452 can include accelerometer, thermometer, microphone, wireless signal receiver, remote physiological monitoring device, light identifier, or the combination thereof.

A second capturing sensor 454 can be the capturing sensor 222. The second capturing sensor 454 can capture the travel condition 202. Examples of the second capturing sensor 454 can include a digital camera, video camera, thermal camera, night vision camera, infrared camera, x-ray camera, or the combination thereof. Examples of the second capturing sensor 454 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
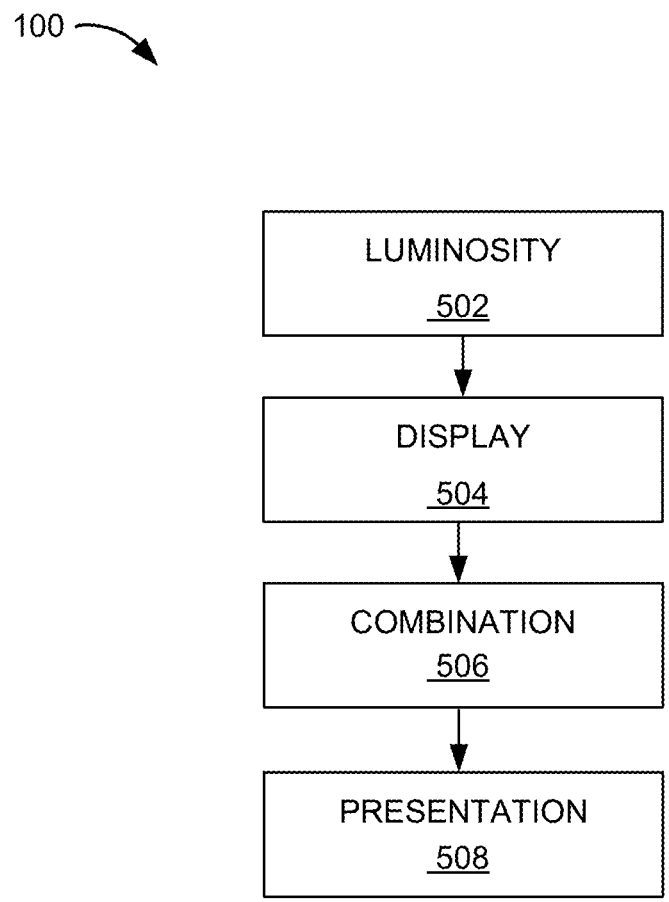
FIG. 5 is a control flow of the navigation system.

Referring now to FIG. 5, therein is shown a control flow of the navigation system 100. The navigation system 100 can include a luminosity module 502. The luminosity module 502 determines the display luminosity 338 of FIG. 3. For example, the luminosity module 502 can determine the display luminosity 338 based on the travel condition 202 of FIG. 2, the display content 330 of FIG. 3, the user preference 224 of FIG. 2, or a combination thereof.

The luminosity module 502 can determine the display luminosity 338 in a number of ways. For example, the luminosity module 502 can determine the display luminosity 338 based on the travel condition 202 including the travel time 208 of FIG. 2, the travel brightness 212 of FIG. 2, the current location 204 of FIG. 2, or a combination thereof.

More specifically as an example, the travel time 208 can indicate that the user is currently traveling during high noon. The travel brightness 212 at the current location 204 can be higher than the travel brightness 212 when the travel time 208 is at dusk. In contrast, the travel brightness 212 can be lower when the travel time 208 is at dusk than the travel brightness 212 at the travel time 208 representing in the early afternoon. As a result, the luminosity module 502 can adjust the display luminosity 338 by increasing or decreasing the display luminosity 338 based on the travel brightness 212 for improving the display of the display content 330.

For a different example, the luminosity module 502 can determine the display luminosity 338 based on the travel condition 202 including the travel speed 214 of FIG. 2, the traffic condition 216 of FIG. 2, the road type 210 of FIG. 2, or a combination thereof. More specifically as an example, the user can currently travel on the road type 210 representing a highway. The travel speed 214 can be faster than the travel speed 214 of when the user is traveling at the road type 210 representing a local road. The traffic condition 216 can represent no traffic on the freeway. The luminosity module 502 can adjust the display luminosity 338 by increasing or decreasing the display luminosity 338 based on the travel speed 214, the traffic condition 216, the road type 210 for minimizing the user's distraction from displaying the display content 330.

For another example, the luminosity module 502 can determine the display luminosity 338 based on the display content 330. More specifically as an example, the display content 330 can include the background content 332 of FIG. 3, the foreground content 334 of FIG. 3, or a combination thereof. Based on the display content 330, the luminosity module 502 can adjust the display luminosity 338 by increasing or decreasing the display luminosity 338 for improving the visibility of the display content 330.

For further example, multiple instances of the display content 330 can be displayed at the same time on the first device 102 of FIG. 1. Each instances of the display content 330 can represent the foreground content 334 or the background content 332. As a result, the luminosity module 502 can adjust the display luminosity 338 by increasing or decreasing the display luminosity 338 based on the whether the display content 330 represents the foreground content 334, the background content 332, or a combination thereof for improving the visibility of the display content 330.

For further example, the luminosity module 502 can determine the display luminosity 338 based on the content priority 336 of FIG. 3 of the display content 330. For example, the display content 330 representing a navigation guidance can have the content priority 336 that is higher than the display content 330 representing an advertisement. As a result, the luminosity module 502 can adjust the display luminosity 338 by increasing or decreasing the display luminosity 338 based on the content priority 336 for improving the visibility of the display content 330 with a higher instance of the content priority 336.

For another example, the luminosity module 502 can determine the display luminosity 338 based on the user preference 224. More specifically as an example, the user preference 224 can indicate a higher preference for a specific instance of the display content 330 over another instance of the display content 330 even if another instance can have a higher instance of the content priority 336. As a result, the luminosity module 502 can adjust the display luminosity 338 by increasing or decreasing the display luminosity 338 based on the user preference 224 for improving the visibility of the display content 330 preferred by the user. The luminosity module 502 can communicate the display luminosity 338 to a display module 504.

The navigation system 100 can include a display module 504, which can be coupled to the luminosity module 502. The display module 504 generates the display area 302 of FIG. 3. For example, the display module 504 can generate the display area 302 including the display extent area 304 of FIG. 3, the display non-extent area 306 of FIG. 3, the display subarea 320 of FIG. 3, or a combination thereof based on controlling the display luminosity 338.

The display module 504 can generate the display area 302 in a number of ways. For example, the display module 504 can generate the display area 302 based on adjusting the top border periphery 314 of FIG. 3, the bottom border periphery 316 of FIG. 3, the side border periphery 318 of FIG. 3, or a combination thereof.

More specifically as an example, the display module 504 can generate the display extent area 304 including the top extent area 308 of FIG. 3, the bottom extent area 310 of FIG. 3, the side extent area 312 of FIG. 3, or a combination thereof. For a specific example, the display module 504 can adjust the top border periphery 314, the bottom border periphery 316, the side border periphery 318, or a combination thereof based on the display luminosity 338. As discussed above, the display area 302 can be built using transparent LCD or similar display film that can be digitally controlled to adjust the display luminosity 338. The display module 504 can increase or decrease the length, width, height, or a combination thereof of the top border periphery 314, the bottom border periphery 316, the side border periphery 318, or a combination thereof of the display area 302 based on adjusting the display luminosity 338.

More specifically as an example, the display module 504 can generate the display extent area 304 based on adjusting the top border periphery 314, the bottom border periphery 316, the side border periphery 318, or a combination thereof based on the display luminosity 338. The display module 504 can adjust the display luminosity 338 of the display extent area 304 to increase or decrease the length, width, height, or a combination thereof of the top border periphery 314, the bottom border periphery 316, the side border periphery 318, or a combination thereof.

For example, the display extent area 304 can represent the top extent area 308. The top extent area 308 can include the top border periphery 314, the bottom border periphery 316, and two instances the side border periphery 318 representing left side and right side. The bottom border periphery 316 of the top extent area 308 can be adjacent to the top border periphery 314 of the display non-extent area 306.

The display module 504 can adjust the display size 324 of FIG. 3. For example, the display module 504 can increase the display size 324 of the top extent area 308 by increasing the length, width, height, or a combination thereof of the bottom border periphery 316 and the side border periphery 318 based on increasing or decreasing the display luminosity 338 of the top extent area 308.

More specifically as an example, the display module 504 can adjust the display luminosity 338 of the top extent area 308 by darkening the display luminosity 338 compared to the display luminosity 338 of the display non-extent area 306. The display module 504 can increase the display size 324 of the top extent area 308 by increasing the length, width, height, or a combination thereof of the bottom border periphery 316 and the side border periphery 318 to increase the display size 324 of the top extent area 308. As a result, the display module 504 can decrease the display size 324 of the display non-extent area 306 by decreasing the length, width, height, or a combination thereof of the top border periphery 314, the bottom border periphery 316, the side border periphery 318, or a combination thereof.

For further example, the display module 504 can adjust the display size 324 of the bottom extent area 310, the side extent area 312, or a combination thereof similarly to the adjustment of the display size 324 of the top extent area 308. More specifically as an example, the display module 504 can increase or decrease the length, width, height, or a combination thereof of the top border periphery 314, the bottom border periphery 316, the side border periphery 318, or a combination thereof of the bottom extent area 310, the side extent area 312, or a combination thereof. As a result, the display module 504 can adjust the display size 324 of the display non-extent area 306 in relation to the change in the display size 324 of the bottom extent area 310, the side extent area 312, or a combination thereof.

For a different example, the display module 504 can generate the display non-extent area 306. More specifically as an example, the display module 504 can generate the display non-extent area 306 based on the display extent area 304, the display luminosity 338, or a combination thereof.

As discussed above, the display non-extent area 306 can be mainly used by the user to view the travel direction 218 of FIG. 2 for operating the vehicle. However, the display module 504 can adjust the display non-extent area 306 relatively based on adjusting the display extent area 304 as discussed above. More specifically as an example, if the display size 324 of the display extent area 304 increases, the relative instance of the display size 324 of the display non-extent area 306 can decrease. In contrast, if the display size 324 of the display extent area 304 decreases, the relative display size 324 of the display non-extent area 306 can increase.

For another example, the display module 504 can generate the display subarea 320 within the display extent area 304, the display non-extent area 306, or a combination thereof. The display module 504 can generate multiple instances of the display subarea 320 by segmenting the display extent area 304. More specifically as an example, the display extent area 304 can represent the top extent area 308.

Rather than having the top extent area 308 covering the full top extent of the display area 302, the display module 504 can generate multiple instances of the display subarea 320 by segmenting the top extent area 308. As a result, the display subarea 320 can cover the partial top extent of the display area 302 for displaying the display content 330. If there are multiple instances of the display subarea 320, the display gap 322 of FIG. 3 can be created between one instance of the display subarea 320 to another instance of the display subarea 320. The display gap 322 can be transparent to provide additional view along with the display non-extent area 306 for the user to see what is in front towards the travel direction 218 while operating the vehicle.

For further example, the display module 504 can generate the display subarea 320 based on controlling the display luminosity 338. As discussed above, the display gap 322 can exist between one instance of the display subarea 320 to another instance of the display subarea 320. The display module 504 can generate the arrangement of the display area 302 and the display gap 322 by controlling the display luminosity 338. For example, the display module 504 can generate the display subarea 320 having the display luminosity 338 darker than the display luminosity 338 of the display gap 322. More specifically as an example, the display module 504 can adjust the display luminosity 338 of the display gap 322 to represent transparent. As a result, the display module 504 can generate the display subarea 320 having the display luminosity 338 contrasting with the display luminosity 338 of the display gap 322.

For another example, the display module 504 can determine the display area 302 based on the travel condition 202, the display content 330, the user preference 224, or a combination thereof. More specifically as an example, the display module 504 can determine the display area 302 based on the travel condition 202 representing the travel brightness 212. If the travel brightness 212 meets or exceeds the brightness threshold 340 of FIG. 3, the display module 504 can generate the display extent area 304 to minimize the brightness from hindering the user operating the vehicle.

For further example, the display module 504 can detect the sunlight contacting the display area 302 using the capturing sensor 222 of FIG. 2. Based on where the sunlight is contacting the display area 302, the display module 504 can adjust the display size 324 and/or display location 328 of FIG. 3 of the display extent area 304, the display subarea 320, or a combination thereof. More specifically as an example, the display module 504 can increase the display size 324, generate, or a combination thereof the display extent area 304, the display subarea 320, or a combination thereof of where the travel brightness 212 is brightest on the display area 302. In contrast, the display module 504 can decrease the display size 324, remove, or a combination thereof the display extent area 304, the display subarea 320, or a combination thereof of where the travel brightness 212 is least bright on the display area 302.

For a different example, the display module 504 can generate the display area 302 based on the travel direction 218. More specifically as an example, the destination 206 of FIG. 2 can be at Cardinal coordinate representing North West from the current location 204. The display module 504 can decrease the display size 324, eliminate, or a combination thereof the display extent area 304, the display subarea 320, or a combination thereof displayed on the travel direction 218 where the user can view towards while operating the vehicle to reduce distraction. In contrast, the display module 504 can increase the display size 324, generate, or a combination thereof the display extent area 304, the display subarea 320, or a combination thereof displayed on the direction other than the travel direction 218 where the user will least likely be viewing during operation of the vehicle.

It has been discovered that the navigation system 100 generating the display area 302 based on the travel condition 202 improves the safety of the user operating the first device 102, the navigation system 100, the vehicle, or a combination thereof. By adjusting the display area 302 according to the travel condition 202, the user can focus on the travel direction 218 to operate the vehicle. As a result, the navigation system 100 can improve the safety of the user by reducing distraction from the display content 330 displayed on the first device 102.

For another example, the display module 504 can generate the display area 302 based on the display content 330. More specifically as an example, the display module 504 can generate the display area 302 based on the content priority 336 of the FIG. 3, the area priority 326 of FIG. 3, or a combination thereof. The display content 330 can represent the advertisement, the navigation guidance, or a combination thereof. The navigation guidance can have a higher instance of the content priority 336 than the advertisement. The top extent area 308 can have a higher instance of the area priority 326 than the side extent area 312, the bottom extent area 310, or a combination thereof.

The display module 504 can generate the display area 302 for the navigation guidance on the top extent area 308 of the display area 302 based on the content priority 336, the area priority 326, or a combination thereof. By having the navigation guidance on the top extent area 308, the user operating the vehicle can easily view the navigation guidance while operating the vehicle. In contrast, the display module 504 can generate the display area 302 for the advertisement on the side extent area 312 of the display area 302 based on the content priority 336, the area priority 326, or a combination thereof. By having the advertisement on the side extent area 312, the advertisement can be less distracting to the user while operating the vehicle.

For a different example, the display module 504 can generate the display area 302 based on the user preference 224. More specifically as an example, the user preference 224 can indicate that the use would not want to receive the advertisement if the travel speed 214 meets or exceeds the speed threshold 220 of FIG. 2. Based on the user preference 224, the travel condition 202, or a combination thereof, if the travel speed 214 below the speed threshold 220, the display module 504 can generate the display area 302 for the display content 330 representing an advertisement.

In contrast, the user preference 224 can indicate that the user would like to see the traffic condition 216 repeatedly if the traffic condition 216 represents a traffic jam. More specifically as an example, the content priority 336 for the information regarding the traffic condition 216 can be higher than the content priority of weather information. As a result, the display module 504 can generate the display area 302 for the traffic condition 216 at the display area 302 with the highest instance of the area priority 326. For example, the top extent area 308 can have the highest instance of the area priority 326. The display module 504 can communicate the display area 302 to a combination module 506.

The navigation system 100 can include the combination module 506, which can be coupled to the display module 504. The combination module 506 determines the display combination 342 of FIG. 3. For example, the combination module 506 can determine the display combination 342 based on the arranging the display extent area 304, the display non-extent area 306, the display subarea 320, or a combination thereof.

The combination module 506 can determine the display combination 342 in a number of ways. For example, the combination module 506 can determine the display combination 342 based on the display luminosity 338, the display content 330, the travel condition 202, or a combination thereof. More specifically as an example, the combination module 506 can determine the display combination 342 to include the display extent area 304 having the display luminosity 338 that is darker than the display non-extent area 306.

For example, the combination module 506 can determine the display combination 342 to include the display extent area 304 where the travel brightness 212 is the brightest. As an example, the travel brightness 212 can be the brightest at the top extent of the display area 302. As a result, the combination module 506 can generate the display combination 342 that includes the top extent area 308 with the display luminosity 338 that is darker than the display luminosity 338 of the display non-extent area 306 to provide a shade.

For another example, the combination module 506 can determine the display combination 342 to include the top extent area 308, the side extent area 312, or a combination thereof based on the display content 330. As discussed above, the display content 330 can include the navigation guidance, the advertisement, or a combination thereof with the content priority 336 of the navigation guidance to be higher. The area priority 326 for the top extent area 308 can be higher than the side extent area 312. As a result, the combination module 506 can determine the display combination 342 to include the top extent area 308 to display the navigation guidance and the side extent area 312 to display the advertisement.

For a different example, the combination module 506 can determine the display combination 342 to include multiple instances of the display subarea 320. More specifically as an example, each instances of the display subarea 320 can be generated at the display location 328 different from each other. For example, the one instance of the display subarea 320 can be displayed within the top extent area 308. Another instance of the display subarea 320 can be displayed within the bottom extent area 310. Based on the travel condition 202, the display content 330, or a combination thereof, the combination module 506 can determine the display combination 342 to rearrange the display location 328 of the display subarea 320 to best suit the viewing experience, safety, or a combination thereof of the user during the operation of the vehicle. The combination module 506 can communicate the display combination 342 to a presentation module 508.

It has been discovered that the navigation system 100 generating the display combination 342 improves the safety of user operating the first device 102, the navigation system 100, the vehicle, or a combination thereof. By generating the display combination 342 suited for the travel condition 202, the user can focus on operating the vehicle. As a result, the user can be less distracted resulting in a safer operation of the first device 102, the navigation system 100, the vehicle, or a combination thereof.

The navigation system 100 can include the presentation module 508, which can be coupled to the combination module 506. The presentation module 508 displays the display content 330. For example, the presentation module 508 can display the display content 330 based on the display area 302. For further example, the presentation module 508 can display the display content 330 based on the travel condition 202, the user preference 224, or a combination thereof.

The presentation module 508 can display the display content 330 in a number of ways. For example, the display area 302 can include the display extent area 304, the display non-extent area 306, or a combination thereof. The display extent area 304 can represent the top extent area 308.

For a specific example, the display area 302 can represent a windshield of the vehicle as discussed above. The display luminosity 338 of the display non-extent area 306 can represent transparent to allow the user of the vehicle to see the travel condition 202. The display luminosity 338 of the top extent area 308 can represent opaque to block the sunlight.

The presentation module 508 can display the display content 330 based on the travel condition 202. For example, the current location 204 can approach a cross street. Based on the current location 204, the travel direction 218, the presentation module 508 can display the display content 330 such as "Main Street 0.2 miles" on the top extent area 308. The presentation module 508 can update the display content 330 on the top extent area 308 as the current location 204 nears the cross street.

For further example, the presentation module 508 can display the display content 330 of the street name on the top extent area 308 when the current location 204 arrives at the cross street. Moreover, the presentation module 508 can display the display content 330 of the navigation guidance on the top extent area 308 to indicate the travel direction 218 that the user should take at the cross street.

For another example, the presentation module 508 can display the display content 330 representing the advertisement, coupon, or a combination thereof on the display extent area 304. More specifically as an example, as the current location 204 nears an exit of the road type 210 representing a highway, the presentation module 508 can display the display content 330 such as "Starbucks™ at the next exit offering 10% discount." The presentation module 508 can display the display content 330 on the top extent area 308, the side extent area 312, the bottom extent area 310, or a combination thereof based on the traffic condition 216.

More specifically as an example, if the traffic condition 216 represents heavy traffic jam, the presentation module 508 can display the advertisement on the side extent area 312 to minimize the distraction to the user operating the vehicle. In contrast, if the traffic condition 216 represents no traffic jam, the presentation module 508 can display the advertisement on the top extent area 308 to allow the user to view the advertisement along with the travel direction 218 viewed through the display non-extent area 306.

For a different example, the presentation module 508 can display the display content 330 representing a vehicle status for the vehicle operated by the user for traveling to the destination 206. If the fuel level for the vehicle is running low, the presentation module 508 can display the display content 330 on the display extent area 304 to indicate the distance to the next refueling station to fill up the gasoline, recharge the battery, or a combination thereof.

For another example, the presentation module 508 can display the display content 330 representing an incoming phone call, the caller's phone number and name, cell phone battery level, or a combination thereof on the display extent area 304. For further example, the presentation module 508 can display the display content 330 representing the travel speed 214, the travel direction 218, the speed limit, or a combination thereof on the display extent area 304. For a different example, the presentation module 508 can display the display content 330 representing emergency or urgent information including weather report, road closure, amber alert, or a combination thereof.

For further example, the presentation module 508 can disable the display area 302 based on the travel condition 202, the user preference 224, or a combination thereof. More specifically as an example, the travel condition 202 can indicate a rain storm, thus, decreasing the visibility of the travel direction 218. The presentation module 508 can disable the display extent area 304 to minimize the distraction from viewing the display content 330 while viewing the travel direction 218 through the display non-extent area 306.

For a different example, the presentation module 508 can disable the display extent area 304 based on the user preference 224. More specifically as an example, the user preference 224 can indicate that the user would like to concentrate on driving during the morning commute. As a result, the presentation module 508 can disable the display extent area 304 if the travel condition 202 indicates that the user is traveling during the morning commute.

For illustrative purposes, the navigation system 100 is described with the display module 504 generating the display area 302, although it is understood that the display area 302 can operate differently. For example, the display module 504 can update the display area 302 based on travel condition 202, the display content 330, the display luminosity 338, the user preference 224, or a combination thereof.

For a specific example, the display module 504 can update the display area 302 by changing the display location 328 of the display extent area 304. More specifically as an example, the display module 504 can initially generate the top extent area 308 based on the travel condition 202 of no traffic jam. However, the traffic condition 216 can change to heavy traffic jam. Based on the traffic condition 216, the display module 504 can update the display area 302 by moving the display extent area 304 from the top extent area 308 to the side extent area 312.

For further example, the display module 504 can update the display area 302 by eliminating the display extent area 304. More specifically as an example, the display module 504 can generate the display area 302 excluding the display extent area 304 to minimize the distraction from displaying the display content 330.

For illustrative purposes, the navigation system 100 is described with the luminosity module 502 determining the display luminosity 338, although it is understood that the luminosity module 502 can operate differently. For example, the luminosity module 502 can update the display luminosity 338 based on the travel condition 202, the display combination 342, the display content 330, the display area 302, the user preference 224, or a combination thereof.

As discussed above, the travel brightness 212 can change based on the change in the travel time 208. As a result, the luminosity module 502 can update the display luminosity 338 to improve the visibility of the display content 330.

For further example, the user preference 224 can indicate the display luminosity 338 for particular instance of the travel condition 202. As a result, the luminosity module 502 can update the display luminosity 338 when the current location 204 is traveling through the travel condition 202 that matches the travel brightness 212 predefined in the user preference 224.

For a different example, the display content 330 can change from one advertisement to another advertisement. The color of the advertisement can differ from one to another. More specifically as an example, the travel brightness 212 that best suits the display of the display content 330 can differ based on the travel condition 202. As a result, based on the travel condition 202, the display content 330, or a combination thereof, the luminosity module 502 can update the display luminosity 338 to adjust the display luminosity 338 best suited for the travel condition 202. More specifically as an example, the luminosity module 502 can update the display luminosity 338 by comparing the coloration of the display content 330 to the travel brightness 212 to adjust the display luminosity 338.

For another example, the luminosity module 502 can determine the display luminosity 338 of one instance of the display area 302 different from another instance of the display area 302. More specifically as an example, the luminosity module 502 can determine the display luminosity 338 of the top extent area 308 to be darker than the display luminosity 338 of the bottom extent area 310. For further example, the luminosity module 502 can update the display luminosity 338 of the top extent area 308 to be brighter than the display luminosity 338 of the bottom extent area 310.

For illustrative purposes, the navigation system 100 is described with the combination module 506 generating the display combination 342, although it is understood that the combination module 506 can operate differently. For example, the combination module 506 can update the display combination 342 based on the travel condition 202, the display content 330, the display area 302, the display luminosity 338, the user preference 224, or a combination thereof.

For a specific example, the user preference 224 can indicate that the user prefers the display combination 342 to include the side extent area 312, the display non-extent area 306, or a combination thereof if the current location 204 is traveling through a geographic area never traveled by the user. For example, the display combination 342 can include the top extent area 308 and the display non-extent area 306 when the user is traveling in the geographic region traveled by the user previously. Once the current location 204 enters the geographic area never traveled, the combination module 506 can update the display combination 342 to include the side extent area 312 and the display non-extent area 306.

For further example, the combination module 506 can update the display combination 342 based on the display content 330. More specifically as an example, the display content 330 can require multiple instances of the display extent area 304 to display the display content 330 in its entirety. The display combination 342 can initially include the top extent area 308 only. Based on the changes in the display content 330, the combination module 506 can update the display combination 342 to include the top extent area 308, multiple instances of the side extent area 312, or a combination thereof to display the display content 330 in its entirety.

The physical transformation from traveling from one instance of the travel condition 202 to another instance of the travel condition 202 results in the movement in the physical world, such as people using the first device 102, the vehicle, or a combination thereof, based on the operation of the navigation system 100. As the movement in the physical world occurs, the movement itself creates additional information that is converted back into determining the display luminosity 338, generating the display area 302, determining the display combination 342, or a combination for the continued operation of the navigation system 100 and to continue the movement in the physical world.

The first software 426 of FIG. 4 of the first device 102 of FIG. 4 can include the modules for the navigation system 100. For example, the first software 426 can include the luminosity module 502, the display module 504, the combination module 506, and the presentation module 508.

The first control unit 412 of FIG. 4 can execute the first software 426 for the luminosity module 502 to determine the display luminosity 338. The first control unit 412 can execute the first software 426 for the display module 504 to generate the display area 302. The first control unit 412 can execute the first software 426 for the combination module 506 to determine the display combination 342. The first control unit 412 can execute the first software 426 for the presentation module 508 to display the display content 330.

The second software 442 of FIG. 4 of the second device 106 of FIG. 4 can include the modules for the navigation system 100. For example, the second software 442 can include the luminosity module 502, the display module 504, the combination module 506, and the presentation module 508.

The second control unit 434 of FIG. 4 can execute the second software 442 for the luminosity module 502 to determine the display luminosity 338. The second control unit 434 can execute the second software 442 for the display module 504 to generate the display area 302. The second control unit 434 can execute the second software 442 for the combination module 506 to determine the display combination 342. The second control unit 434 can execute the second software 442 for the presentation module 508 to display the display content 330.

The modules of the navigation system 100 can be partitioned between the first software 426 and the second software 442. The second software 442 can include the luminosity module 502, the display module 504, and the combination module 506. The second control unit 434 can execute modules partitioned on the second software 442 as previously described.

The first software 426 can include the presentation module 508. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to communicate the display luminosity 338, the display area 302, the display combination 342, the display content 330, or a combination thereof to or from the second device 106. The first control unit 412 can operate the first software 426 to operate the location unit 420 of FIG. 4. The second control unit 434 can operate the second communication unit 436 of FIG. 4 to communicate the display luminosity 338, the display area 302, the display combination 342, the display content 330, or a combination thereof, or a combination thereof to or from the first device 102 through the communication path 104 of FIG. 4.

The first control unit 412 can operate the first user interface 418 of FIG. 4 to present the digital representation of the current location 204, the destination 206, or a combination thereof. The second control unit 434 can operate the second user interface 438 of FIG. 4 to present the digital representation of the current location 204, the destination 206, or a combination thereof.

The navigation system 100 describes the module functions or order as an example. The modules can be partitioned differently. For example, the display module 504 and the combination module 506 can be combined. Each of the modules can operate individually and independently of the other modules. Furthermore, data generated in one module can be used by another module without being directly coupled to each other. For example, the combination module 506 can receive the display luminosity 338 from the luminosity module 502. Further, one module communicating to another module can represent one module sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

It has been discovered that the navigation system 100 determining the display luminosity 338 based on the travel condition 202 improves the safety of the user operating the first device 102, the navigation system 100, the vehicle, or a combination thereof. By determining the display luminosity 338, the navigation system 100 can generate the display area 302 by controlling the display luminosity 338. Subsequently, the navigation system 100 can generate the display combination 342 based on the display area 302 to include the display extent area 304, the display non-extent area 306, or a combination thereof for display the display content 330. As a result, the navigation system 100 can generate the display combination 342 best suited for the travel condition 202 to reduce distraction from displaying the display content 30, thus, improving the safety of the user operating the first device 102, the navigation system 100, the vehicle, or a combination thereof.

Figure 6:
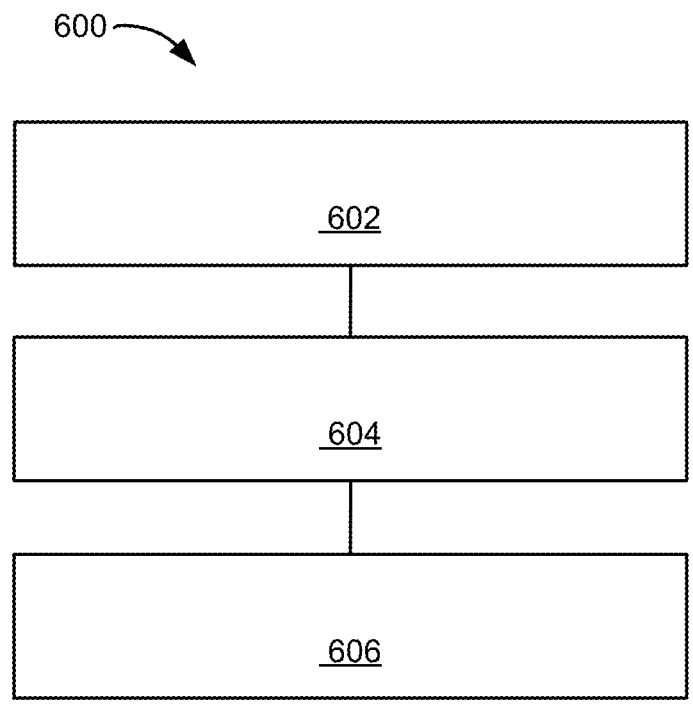
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a display luminosity with a control unit based on a travel condition in a block 602; generating a display area based on controlling the display luminosity in a block 604; and generating a display combination based on the display area including a display extent area, a display non-extent area, or a combination thereof for displaying a display content on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a display luminosity with a control unit based on a travel condition;
   generating multiple instances of a display area based on controlling the display luminosity wherein the display area representing a surface area for viewing outside of a vehicle;
   generating a display combination based on the display area including a display extent area, a display non-extent area, or a combination thereof for displaying a display content on a device wherein the display extent area including at least one periphery as an extent of the display area; and
   updating each of the display area by adjusting a display size by increasing or decreasing the display size of the display area depending on a travel direction wherein the display area located opposite from the travel direction is heading having the display size adjusted differently from the display size of the display area located towards where the travel direction is heading for updating the display combination.

2. The method as claimed in claim 1 wherein generating the display area includes adjusting a display size of the display area based on adjusting the display luminosity.

3. The method as claimed in claim 1 wherein generating the display area includes generating the display area based on a content priority of the display content.

4. The method as claimed in claim 1 wherein generating the display area includes adjusting a top border periphery, a bottom border periphery, a side border periphery, or a combination thereof based on controlling the display luminosity.

5. The method as claimed in claim 1 further comprising disabling the display extent area for minimizing a distraction from viewing the display content while viewing a travel direction.

6. The method as claimed in claim 1 further comprising updating the display area based on changing a display location of the display extent area.

7. The method as claimed in claim 1 further comprising determining the display area based on a travel brightness meeting or exceeding a brightness threshold for controlling the travel brightness.

8. The method as claimed in claim 1 further comprising updating the display luminosity based on the travel condition for improving visibility of the display content.

9. The method as claimed in claim 1 further comprising updating the display combination based on the display content to be displayed for selecting the display extent area suited for viewing the display content.

10. The method as claimed in claim 1 further comprising generating multiple instances of a display subarea within the display extent area with a display gap between instances of the display subarea for displaying the display content.

11. A navigation system comprising:
    a control unit including a processor for:
       determining a display luminosity based on a travel condition, generating multiple instances of a display area based on controlling the display luminosity wherein the display area representing a surface area for viewing outside of a vehicle, generating a display combination based on the display area including a display extent area, a display non-extent area, or a combination thereof wherein the display extent area including at least one periphery as an extent of the display area, updating each of the display area by adjusting a display size by increasing or decreasing the display size of the display area depending on a travel direction wherein the display area located opposite from the travel direction is heading having the display size adjusted differently from the display size of the display area locating towards where the travel direction is heading for updating the display combination, and a communication interface including a microelectronic, coupled to the control unit, for communicating the display combination for displaying a display content on a device.

12. The system as claimed in claim 11 wherein the control unit is for adjusting a display size of the display area based on adjusting the display luminosity.

13. The system as claimed in claim 11 wherein the control unit is for generating the display area based on a content priority of the display content.

14. The system as claimed in claim 11 wherein the control unit is for adjusting a top border periphery, a bottom border periphery, a side border periphery, or a combination thereof based on controlling the display luminosity.

15. The system as claimed in claim 11 wherein the control unit is for disabling the display extent area for minimizing a distraction from viewing the display content while viewing a travel direction.

16. A non-transitory computer readable medium including instructions for execution, the instructions comprising:

determining a display luminosity based on a travel condition;

generating multiple instances of a display area based on controlling the display luminosity wherein the display area representing a surface area for viewing outside of a vehicle;

generating a display combination based on the display area including a display extent area, a display non-extent area, or a combination thereof for displaying a display content on a device wherein the display extent area including at least one periphery as an extent of the display area; and updating each of the display area by adjusting a display size by increasing or decreasing the display size of the display area depending on a travel direction wherein the display area located opposite from the travel direction is heading having the display size adjusted differently from the display size of the display area locating towards where the travel direction is heading for updating the display combination.

17. The non-transitory computer readable medium as claimed in claim 16 wherein generating the display area includes adjusting a display size of the display area based on adjusting the display luminosity.

18. The non-transitory computer readable medium as claimed in claim 16 wherein generating the display area includes generating the display area based on a content priority of the display content.

19. The non-transitory computer readable medium as claimed in claim 16 wherein generating the display area includes adjusting a top border periphery, a bottom border periphery, a side border periphery, or a combination thereof based on controlling the display luminosity.

20. The non-transitory computer readable medium as claimed in claim 16 further comprising disabling the display extent area for minimizing a distraction from viewing the display content while viewing a travel direction.

* * * * *